US012767010B2

(12) United States Patent
Matsugi et al.

(10) Patent No.: US 12,767,010 B2
(45) Date of Patent: Oct. 20, 2026

(54) MOBILE OBJECT SETTING DEVICE, MOBILE OBJECT SETTING METHOD, AND STORAGE MEDIUM

(71) Applicant: HONDA MOTOR CO., LTD., Tokyo (JP)

(72) Inventors: Yoshihiro Matsugi, Tokyo (JP); Naoki Shibata, Tokyo (JP); Koji Hashimoto, Tokyo (JP); Shogo Usui, Tokyo (JP); Shohei Kamochi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 9 days.

(21) Appl. No.: 18/583,927

(22) Filed: Feb. 22, 2024

(65) Prior Publication Data

US 2024/0326659 A1 Oct. 3, 2024

(30) Foreign Application Priority Data

Mar. 29, 2023 (JP) ................................ 2023-052639

(51) Int. Cl.
*B60N 2/02* (2006.01)

(52) U.S. Cl.
CPC .................................. *B60N 2/0248* (2013.01)

(58) Field of Classification Search
CPC ................ B60N 2/0248; B60N 2/0244; G07C 9/00174; G07C 9/00309; G07C 9/00571; G07C 2009/00579; G07C 2009/00587
See application file for complete search history.

(56) References Cited

U.S. PATENT DOCUMENTS 5,497,326 A * 3/1996 Berland ............. G05B 19/4062 49/28
5,668,675 A * 9/1997 Fredricks .......... B60R 21/01552 359/872

(Continued)

FOREIGN PATENT DOCUMENTS

CN 101830219 A * 9/2010 ............ B60W 10/08
CN 202294522 U * 7/2012

(Continued)

OTHER PUBLICATIONS

"EV sharing second car system with ITS technologies in residential area;" Shibata et al., IVEC2001. Proceedings of the IEEE International Vehicle Electronics Conference 2001. IVEC 2001 (Cat. No.01EX522) (2001, pp. 181-186); Jan. 1, 2001. (Year: 2001).*

(Continued)

*Primary Examiner* — Khoi H Tran
*Assistant Examiner* — Jorge O Peche
(74) *Attorney, Agent, or Firm* — Amin, Turocy & Watson, LLP

(57) ABSTRACT

A mobile object setting device for setting equipment provided in a mobile object includes a storage device configured to store a program and setting information of the equipment and a hardware processor. The hardware processor manages the setting information in association with a user of the mobile object by executing the program stored in the storage device, registers user information about the user and the setting information of the equipment in the storage device, identifies the user of the mobile object, and acquires the setting information of the equipment associated with the identified user from the storage device to set the equipment based on the acquired setting information. The hardware processor acquires first setting information, which is the setting information of the equipment associated with first user information registered in advance, from the storage (Continued)

1 device and registers the acquired first setting information in association with second user information different from the first user information.

6 Claims, 6 Drawing Sheets

(56) References Cited

U.S. PATENT DOCUMENTS

| | | | | |
|---|---|---|---|---|
| 5,812,399 | A * | 9/1998 | Judic | B60N 2/0226 296/65.01 |
| 6,078,854 | A * | 6/2000 | Breed | B60N 2/0277 701/45 |
| 6,198,996 | B1 * | 3/2001 | Berstis | B60R 25/2081 726/20 |
| 6,230,084 | B1 * | 5/2001 | Kijima | B60G 17/0195 701/1 |
| 6,505,780 | B1 * | 1/2003 | Yassin | B60R 25/24 235/492 |
| 6,665,600 | B2 * | 12/2003 | Miller | B60N 2/0252 701/49 |
| 6,675,082 | B2 * | 1/2004 | Galli | B60R 16/037 701/49 |
| 6,724,322 | B2 * | 4/2004 | Tang | B60R 25/24 340/12.54 |
| 6,759,943 | B2 * | 7/2004 | Lucy | B60N 2/0248 340/5.72 |
| 8,180,509 | B2 * | 5/2012 | Grider | B60W 20/00 701/22 |
| 10,189,377 | B2 * | 1/2019 | Nasca | B60N 2/0228 |
| 10,668,786 | B2 * | 6/2020 | Rodriguez | B60H 1/3414 |
| 11,294,458 | B2 * | 4/2022 | Ireland | G06F 3/013 |
| 2002/0048391 | A1 * | 4/2002 | Kim | B60R 25/252 382/124 |
| 2003/0195686 | A1 * | 10/2003 | Miller | B60N 2/0273 701/49 |
| 2003/0204296 | A1 * | 10/2003 | Galli | B60R 16/037 701/49 |
| 2005/0099263 | A1 * | 5/2005 | Ikeda | E05B 77/48 340/426.36 |
| 2007/0157266 | A1 * | 7/2007 | Ellis | H04N 21/482 348/E7.071 |
| 2009/0056475 | A1 * | 3/2009 | Grabowski | B60R 22/00 73/862.391 |
| 2012/0007401 | A1 * | 1/2012 | Hashimoto | B60N 2/22 297/344.13 |
| 2016/0031506 | A1 * | 2/2016 | Lloyd | B62K 3/00 701/49 |
| 2016/0189064 | A1 * | 6/2016 | Mao | G06Q 30/0631 705/5 |
| 2016/0292919 | A1 * | 10/2016 | Ireland | H04L 67/535 |
| 2017/0174158 | A1 * | 6/2017 | Ding | B60R 16/037 |
| 2017/0285641 | A1 * | 10/2017 | Goldman-Shenhar | B60W 60/00136 |
| 2017/0305304 | A1 * | 10/2017 | Koh | B60N 2/0252 |
| 2017/0334451 | A1 * | 11/2017 | Asakura | B60W 10/04 |
| 2018/0105069 | A1 * | 4/2018 | Nasca | B60N 2/12 |
| 2018/0162320 | A1 * | 6/2018 | Lee | B60R 16/02 |
| 2018/0345889 | A1 * | 12/2018 | Pinkelman | B60N 2/002 |
| 2019/0077218 | A1 * | 3/2019 | Rodriguez | B60H 1/00971 |
| 2019/0315297 | A1 * | 10/2019 | Yamada | B60W 50/08 |
| 2020/0070758 | A1 * | 3/2020 | Cockings | B60R 16/037 |
| 2020/0146043 | A1 * | 5/2020 | Tang | H04W 80/02 |
| 2020/0247337 | A1 * | 8/2020 | Brown | B60T 7/06 |
| 2021/0197767 | A1 * | 7/2021 | Ohashi | B60R 25/252 |
| 2021/0284088 | A1 * | 9/2021 | Yamaguchi | B60R 16/0231 |
| 2022/0258753 | A1 * | 8/2022 | Lee | H04W 4/40 |
| 2022/0281470 | A1 * | 9/2022 | Hanchett | B60W 50/00 |
| 2022/0312191 | A1 | 9/2022 | Matsugi et al. | |
| 2022/0379905 | A1 * | 12/2022 | Takagi | B60N 2/06 |
| 2022/0410705 | A1 * | 12/2022 | Seger, Jr. | G06F 3/04883 |
| 2022/0413596 | A1 * | 12/2022 | Seger, Jr. | G06F 3/0227 |
| 2023/0089472 | A1 | 3/2023 | Yamaguchi et al. | |
| 2023/0288924 | A1 * | 9/2023 | Ikeda | G05D 1/0016 |
| 2024/0174237 | A1 * | 5/2024 | Hanchett | B60R 1/26 |
| 2024/0257070 | A1 * | 8/2024 | Merg | G06Q 10/20 |
| 2024/0283380 | A1 * | 8/2024 | Nagatani | H02P 7/04 |
| 2024/0308444 | A1 * | 9/2024 | Suzuki | B60R 16/0231 |
| 2024/0326659 | A1 * | 10/2024 | Matsugi | B60N 2/0248 |
| 2024/0326724 | A1 * | 10/2024 | Matsugi | B60R 16/023 |
| 2025/0236214 | A1 * | 7/2025 | Usui | B60N 2/0244 |
| 2025/0236215 | A1 * | 7/2025 | Maitre | B60N 2/0248 |

FOREIGN PATENT DOCUMENTS

| | | | | |
|---|---|---|---|---|
| CN | 103345265 | A * | 10/2013 | |
| CN | 110316027 | A * | 10/2019 | B60R 16/023 |
| CN | 215621527 | U * | 1/2022 | |
| CN | 115023691 | | 9/2022 | |
| CN | 115817405 | | 3/2023 | |
| DE | 4034557 | A * | 5/1992 | |
| DE | 4034557 | A1 * | 5/1992 | B60N 2/0248 |
| DE | 102021119254 | A1 * | 2/2023 | B60N 2/0248 |
| FR | 2668618 | A1 * | 4/1992 | G05B 19/23 |
| JP | 2010-214972 | | 9/2010 | |
| JP | 2017-052409 | | 3/2017 | |
| JP | 2017052409 | A * | 3/2017 | |
| JP | 2022-152073 | | 10/2022 | |
| JP | 7710483 | B2 * | 7/2025 | |
| KR | 101232640 | B1 * | 2/2013 | H04W 88/08 |

OTHER PUBLICATIONS

"Intelligent Car Security System Based on Fingerprint Identification and Internet of Things;" Shuai et al., 2021 13th International Conference on Computational Intelligence and Communication Networks (CICN) (2021, pp. 183-187); Sep. 22, 2021. (Year: 2021).*

"Research and Protection of Security Technology for Intelligent Connected Vehicle Keys;" Yu et al., 2024 4th International Conference on Electronic Information Engineering and Computer Science (EIECS) (2024, pp. 646-651); Sep. 27, 2024. (Year: 2024).*

JP 2017052409 A—Machine Translation (Year: 2017).*

Japanese Office Action for Japanese Patent Application No. 2023-052639 mailed Jan. 7, 2025.

Chinese Office Action for Chinese Patent Application No. 202410194494.5 mailed Jul. 11, 2026.

* cited by examiner

FIG. 2

92

| USER ID | CORRESPONDING TERMINAL ID | SEAT POSITION SETTING INFORMATION |
| --- | --- | --- |
| PREDETERMINED USER #1 | 1 | [{S1, aaa}] |
| PREDETERMINED USER #2 | 2 | [{S1, bbb}, {S2, ccc}] |
| GENERAL USER #1 | — | [PATTERN 1], [PATTERN 2], [PATTERN 3], [PATTERN 4] |
| GENERAL USER #2 | — | … |
| GENERAL USER #3 | — | … |
| GENERAL USER #4 | — | … |
| GUEST USER | — | … |

MOBILE OBJECT SETTING DEVICE, MOBILE OBJECT SETTING METHOD, AND STORAGE MEDIUM

CROSS-REFERENCE TO RELATED APPLICATION

Priority is claimed on Japanese Patent Application No. 2023-052639, filed Mar. 29, 2023, the content of which is incorporated herein by reference.

BACKGROUND

Field of the Invention

The present invention relates to a mobile object setting device, a mobile object setting method, and a storage medium.

Description of Related Art

Conventionally, a so-called smart entry function in which a vehicle door can be locked and unlocked without taking out a portable device such as an electronic key by performing a comparison process for a key ID (portable device unique information), which is unique information for each portable device, is known. In relation to the smart entry function, technology for transmitting information stored in a user's electronic key to a vehicle-side device through wireless communication, reading setting information associated with the information received by the vehicle-side device from the electronic key, and automatically adjusting the vehicle's driving environment (a seat position or the like) based on the setting information has been proposed (Japanese Unexamined Patent Application, First Publication No. 2010-214972). In some conventional smart entry functions, different setting information can be associated with a plurality of electronic keys. In recent years, as technology for automatically adjusting a vehicle's driving environment, technology for performing user management with an in-vehicle device connected to a vehicle electronic control unit (ECU) and automatically adjusting the driving environment based on setting information of a logged-in user has also been developed. In this case, the user can flexibly change the setting content of the driving environment by changing the logged-in user, so that the convenience of the vehicle is improved.

SUMMARY

However, when the automatic adjustment function for the driving environment in the conventional in-vehicle device is used, a user needs to create information about a user to use in the in-vehicle device in advance. Here, when the information about the user whose use is possible is not created in the in-vehicle device, the user needs to add a new user to the in-vehicle device. However, at this time, the automatic adjustment function may operate according to setting information of the added new user at a timing unintended by the user. Thus, the conventional in-vehicle device has a possibility of reducing the convenience of the automatic adjustment function of the driving environment.

The present invention has been made in consideration of such circumstances and an objective of the present invention is to provide a mobile object setting device, a mobile object setting method, and a storage medium capable of improving convenience related to automatic adjustment in relation to a vehicle control system that automatically adjusts a driving environment of a vehicle in conjunction with an in-vehicle device having a user management function. In the end, it will further improve traffic safety and contribute to the development of a sustainable transportation system.

(1): According to an aspect of the present invention, there is provided a mobile object setting device for setting equipment provided in a mobile object, the mobile object setting device including: a storage device configured to store a program and setting information of the equipment; and a hardware processor, wherein the hardware processor manages the setting information in association with a user of the mobile object by executing the program stored in the storage device, registers user information about the user and the setting information of the equipment in the storage device, identifies the user of the mobile object, and acquires the setting information of the equipment associated with the identified user from the storage device to set the equipment based on the acquired setting information, and wherein the hardware processor acquires first setting information, which is the setting information of the equipment associated with first user information registered in advance, from the storage device and registers the acquired first setting information in association with second user information different from the first user information.

(2): In the above-described aspect (1), the hardware processor registers setting information having the same content as the setting information associated with the first user information in association with the second user information when the second user information is newly registered.

(3): In the above-described aspect (2), the equipment is a seat provided in the mobile object, the setting information of the equipment is seat position setting information for setting a position of the seat, and the hardware processor associates a copy of seat position setting information associated with the first user information with seat position setting information of the second user information.

(4): In the above-described aspect (3), the mobile object has a plurality of pieces of the equipment and the seat position setting information within setting information of the plurality of pieces of the equipment is copied and setting information other than the seat position setting information is not copied.

(5): According to an aspect of the present invention, there is provided a mobile object setting method including: managing, by a setting device for setting equipment provided in a mobile object, setting information of the equipment in association with a user of the mobile object in a storage device configured to store the setting information; registering, by the setting device, user information about the user and the setting information of the equipment in the storage device; identifying, by the setting device, the user of the mobile object; acquiring, by the setting device, the setting information of the equipment associated with the identified user from the storage device to set the equipment based on the acquired setting information; and acquiring, by the setting device, first setting information, which is the setting information of the equipment associated with first user information registered in advance, from the storage device in the registration of the setting information and registering the acquired first setting information in association with second user information different from the first user information.

(6): According to an aspect of the present invention, there is provided a storage medium storing a program for causing a setting device for setting equipment provided in a mobile object to: manage setting information of the equipment in association with a user of the mobile object in a storage device configured to store the setting information; register user information about the user and the setting information of the equipment in the storage device; identify the user of the mobile object; acquire the setting information of the equipment associated with the identified user from the storage device to set the equipment based on the acquired setting information; and acquire first setting information, which is the setting information of the equipment associated with first user information registered in advance, from the storage device in the registration of the setting information and register the acquired first setting information in association with second user information different from the first user information.

According to (1) to (6), it is possible to improve convenience related to automatic adjustment in relation to a vehicle control system that automatically adjusts a driving environment of a vehicle in conjunction with an in-vehicle device having a user management function.

BRIEF DESCRIPTION OF THE DRAWINGS

FIG. 2 is a figure showing an example of content of account management information 92.

DESCRIPTION OF EMBODIMENTS

Hereinafter, embodiments of a mobile object setting device, a mobile object setting method, and a storage medium of the present invention will be described with reference to the drawings.

[1. Overall Configuration of Vehicle Control System]

Figure 1:
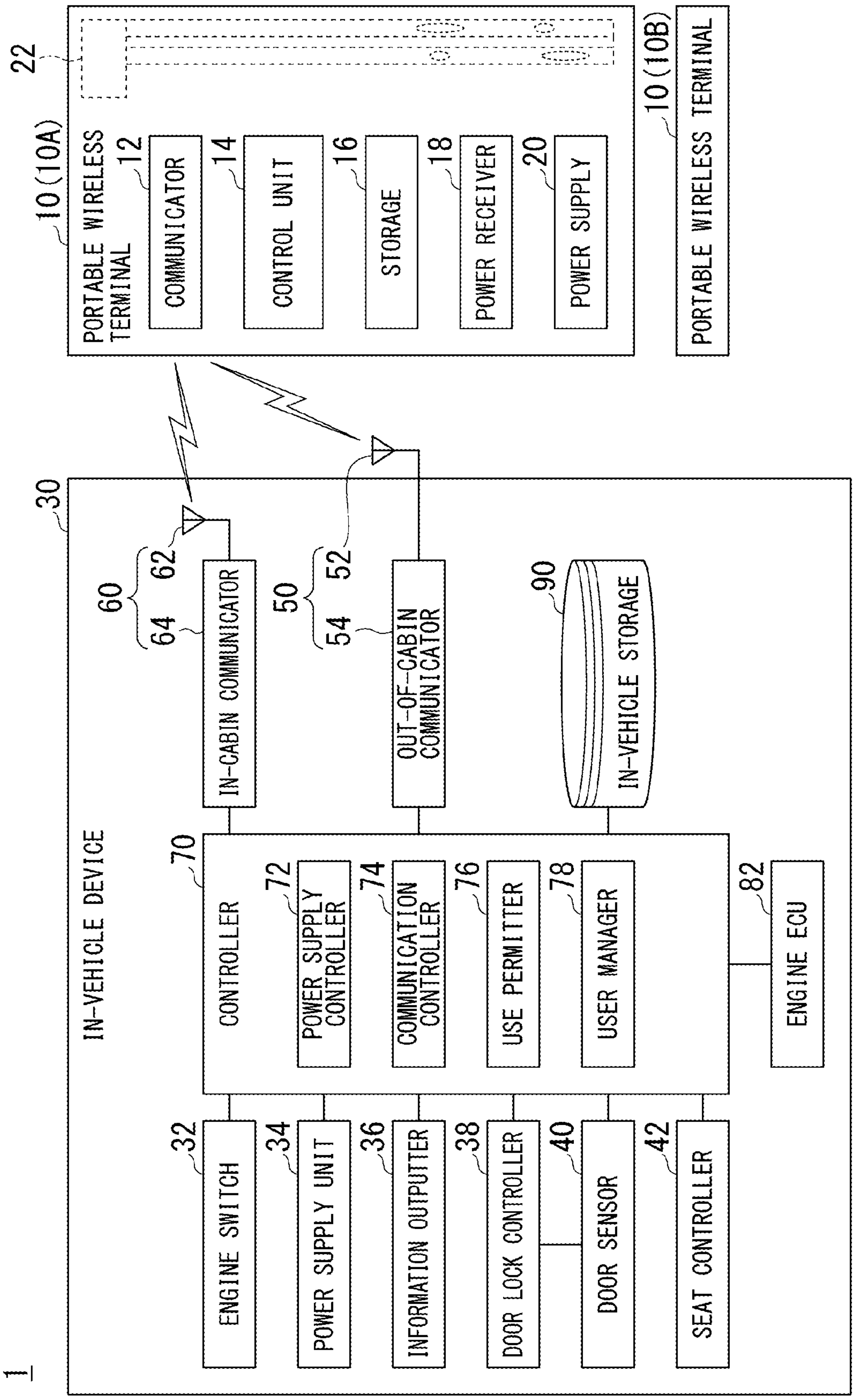
FIG. 1 is a diagram showing an example of a configuration of a vehicle control system 1 of an embodiment.

FIG. 1 is a diagram showing an example of a configuration of a vehicle control system 1 of an embodiment. The vehicle control system 1 includes a plurality of portable wireless terminals 10 and an in-vehicle device 30 mounted in a control target vehicle (hereinafter referred to as a "host vehicle"). The portable wireless terminal 10 is an example of an "electronic key" for a vehicle. The portable wireless terminal 10 and the in-vehicle device 30 can communicate with each other through wireless communication and the in-vehicle device 30 causes the host vehicle to perform a predetermined operation using communication with the portable wireless terminal 10 as a trigger. With such a mechanism, the user can use the portable wireless terminal 10 to cause the host vehicle to perform an operation such as unlocking a door lock or starting an engine. The in-vehicle device 30 is an example of a "mobile object setting device." The host vehicle is an example of a mobile object and a mobile object serving as a setting target of the mobile object setting device may be a mobile object other than a car, such as a watercraft or an aircraft.

Portable wireless terminals 10A and 10B are examples of a plurality of portable wireless terminals 10 and have similar functional configurations. Here, two portable wireless terminals 10 are exemplified in consideration of a main key and a spare key, but the number of portable wireless terminals 10 may be one or three or more. Hereinafter, unless otherwise distinguished, the portable wireless terminals 10A and 10B are collectively referred to as a portable wireless terminal 10. Hereinafter, when it is necessary to distinguish the portable wireless terminals 10A and 10B in the description with respect to a functional configuration similar to that described above, "A" or "B" may be added to the reference sign of each functional unit to distinguish them. For example, it is assumed that a "communicator 12A" is a communicator 12 of the portable wireless terminal 10A. The portable wireless terminal 10 is an example of a "terminal device."

[2. Configuration of Portable Wireless Terminal]

The portable wireless terminal 10 is, for example, a so-called FOB key (key fob), a thin card key, or the like. These portable wireless terminals 10, for example, have sizes with which they can be accommodated in a pants pocket or a wallet. The portable wireless terminal 10, for example, has a size of about several centimeters (cm) to 10 cm in length, several centimeters (cm) to 10 cm in width, and several millimeters (mm) to several centimeters (cm) in thickness. In the following embodiment, an example in which the portable wireless terminal 10 is a FOB key will be described, but it may be another electronic key. The portable wireless terminal 10 may have the above-described function by installing an application program in a portable phone such as a smartphone, a tablet terminal, or the like.

In the portable wireless terminal 10, for example, a communicator 12, a control unit 14 including an integrated circuit and the like, a storage 16, a power receiver 18, a power supply 20, and a mechanical key 22 are housed in a housing (not shown). For example, the communicator 12 performs a predetermined process such as amplification or demodulation for received radio waves or generates radio waves to be transmitted. The storage 16 stores a terminal ID, which is identification information of the portable wireless terminal 10, in advance.

The control unit 14 normally controls the portable wireless terminal 10 in a sleep state, which is a power-saving state. When a request signal is received from the in-vehicle device 30, the control unit 14 controls the portable wireless terminal 10 so that the portable wireless terminal 10 transitions from the sleep state to a startup state. The control unit 14 causes the communicator 12 to transmit a (out-of-cabin or in-cabin) response signal that is a response signal corresponding to the reception of a (out-of-cabin or in-cabin) request signal transmitted from the in-vehicle device 30.

The power supply 20 is, for example, a button battery. The portable wireless terminal 10 operates with electric power supplied from the power supply 20. When an amount of electric power stored in the power supply 20 (a residual power amount) is insufficient, the portable wireless terminal 10 does not operate. In this case, the user needs to replace, for example, the button battery. The power supply 20 may be, for example, a battery capable of being charged with electric power supplied through a Universal Serial Bus (USB).

The mechanical key 22 is a key for mechanically unlocking or locking a lock of a door (a door lock). When the user inserts the mechanical key 22 into a keyhole of the door of the host vehicle and performs a predetermined operation, the door lock of the host vehicle transitions to an unlocked or locked state.

[3. Configuration of In-Vehicle Device]

The in-vehicle device 30 is mounted in the host vehicle. The in-vehicle device 30 can control each part of the host vehicle so that each part of the host vehicle can perform a predetermined operation. The predetermined operation is an operation for adjusting a driving environment of the host vehicle to a mode according to the user. In the present embodiment, the adjustment of the seat position will be described as an example of adjustment of the driving environment. The in-vehicle device 30 has a user account management function (user management function) and can switch an operating environment for each user account. The in-vehicle device 30 automatically adjusts the seat position based on setting information of a designated user account when the user uses the host vehicle. For example, a part or all of the user management function may be implemented by an operating system or may be implemented as an application program function operating on the operating system. The automatic adjustment function for the seat position may be implemented as a function of the operating system or as a function of an application program operating on the operating system.

The host vehicle in which the in-vehicle device 30 is mounted is, for example, a vehicle such as a three- or four-wheeled vehicle, and includes a vehicle using an internal combustion engine such as a diesel engine or a gasoline engine as a motive power source, an electric vehicle using an electric motor as a motive power source, a hybrid vehicle having an internal combustion engine and an electric motor, or the like. The above-described electric vehicle is driven using electric power with which a battery such as, for example, a secondary battery, a hydrogen fuel cell, a metal fuel cell, or an alcohol fuel cell, is discharged.

The in-vehicle device 30 includes, for example, an engine switch 32, a power supply unit 34, an information outputter 36, a door lock controller 38, a door sensor 40, a seat controller 42, an out-of-cabin communication unit 50, an in-cabin communication unit 60, a controller 70, an engine ECU 82, and an in-vehicle storage 90.

The engine switch 32 is, for example, a switch provided at a position where a manipulation can be performed by a user of the host vehicle. The engine switch 32 is, for example, a mechanical switch. When the engine switch 32 is manipulated by the user, a manipulation signal indicating that a manipulation has been performed is output to the controller 70.

The power supply unit 34 is provided, for example, in the vicinity of the engine switch 32. When the engine switch 32 has been manipulated, the power supply unit 34 supplies electric power from the engine switch 32 to a portable wireless terminal 10 located within a predetermined range based on control of the controller 70. For example, the power supply unit 34 and the power receiver 18 of the portable wireless terminal 10 transmit and receive electric power using the principle of electromagnetic induction.

The information outputter 36 outputs predetermined information in accordance with an instruction of the controller 70. The information outputter 36 is a display that displays indicators and information as images. The display is, for example, a display of an instrument panel that displays a state (speed or the like) of the host vehicle. The display may be, for example, a liquid crystal display (LCD), an organic electroluminescence (EL) display device, or the like. The display may be a head-up display that reflects an image on a window of the host vehicle, a display provided in a navigation device, or the like. The information outputter 36 may be a speaker that outputs a sound.

The door lock controller 38 and the seat controller 42 are implemented by executing a program in a processor such as, for example, a central processing unit (CPU). The door lock controller 38 is connected to a door lock actuator (not shown), the door sensor 40, and the controller 70. For example, when an instruction signal for the locking or unlocking of the door lock of the host vehicle has been received from the controller 70, the door lock controller 38 controls the door lock actuator so that the door lock actuator executes the locking or unlocking of the door lock. The door lock actuator controls the door lock so that the door lock is in an open or closed state by driving a door lock mechanism provided in the host vehicle. The door lock controller 38 may be a part of the controller 70.

The door sensor 40 is, for example, a capacitance change type touch sensor in which the capacitance changes when the user touches a door handle. The door sensor is in an OFF state normally. When the user touches the door handle and the capacitance changes to a predetermined value or more, the door sensor 40 outputs an instruction signal for unlocking the door lock in an ON state to the controller 70 via the door lock controller 38.

The seat controller 42 is connected to the seat drive actuator (not shown) and the controller 70. For example, when an instruction signal for a change in the position of the seat in the host vehicle has been received from the controller 70, the seat controller 42 controls the seat drive actuator so that the seat drive actuator moves the seat back and forth. A control target of the seat controller 42 is typically a driver's seat and/or a passenger seat, but other seats may also be controlled if other seats can be electrically controlled. The seat drive actuator moves the seat to a designated position by driving a sliding mechanism provided in the host vehicle to move the seat back and forth. When the seat is an electrically controllable reclining seat, the seat controller 42 may be configured to control a tilt of the seat in addition to the seat position. The seat controller 42 may be a part of the controller 70.

The out-of-cabin communication unit 50 includes an out-of-cabin antenna 52 and an out-of-cabin communicator 54 electrically connected to the out-of-cabin antenna 52. The out-of-cabin antenna 52 is provided, for example, on a door mirror on the driver's seat side of the host vehicle, the door handle, or the like. The out-of-cabin communicator 54 is provided, for example, below the surface of an instrument panel. In accordance with the reception of an instruction signal for unlocking the door lock or an instruction signal for locking the door lock from the controller 70, the out-of-cabin communication unit 50 transmits an out-of-cabin request signal for requesting the transmission of a terminal ID to the portable wireless terminal 10 outside of the cabin. The out-of-cabin antenna 52 receives an out-of-cabin response signal transmitted from the portable wireless terminal 10. The out-of-cabin communicator 54 acquires an out-of-cabin response signal received by the out-of-cabin antenna 52, performs amplification, decoding, or other processing on the acquired out-of-cabin response signal, and outputs information included in the out-of-cabin response signal to the controller 70.

The in-cabin communication unit 60 is provided, for example, under the surface of the instrument panel. The in-cabin communication unit 60 includes an in-cabin antenna 62 and an in-cabin communicator 64 electrically connected to the in-cabin antenna 62. The in-cabin antenna 62 transmits an in-cabin request signal to the portable wireless terminal 10 in the cabin. The in-cabin antenna 62 receives an in-cabin response signal from the portable wireless terminal 10 in the cabin. The in-cabin communicator 64 acquires the in-cabin response signal received by the in-cabin antenna 62, performs amplification, decoding, or other processing on the acquired in-cabin signal, and outputs information included in the in-cabin response signal to the controller 70.

The controller 70 includes, for example, a power supply controller 72, a communication controller 74, a use permitter 76, and a user manager 78. The power supply controller 72, the communication controller 74, the use permitter 76, and the user manager 78 are implemented by a hardware processor such as a CPU executing the program (software). The program may be implemented, for example, as a vehicle operating system having a control function of the host vehicle, or may be implemented as an application program operating on the vehicle operating system. Also, some or all of these components may be implemented by hardware (including a circuit; circuitry) such as a large-scale integration (LSI) circuit, an application-specific integrated circuit (ASIC), a field-programmable gate array (FPGA), or a graphics processing unit (GPU) or may be implemented by software and hardware in cooperation. The in-vehicle storage 90 is implemented by, for example, a non-volatile storage device such as a read-only memory (ROM), an electrically erasable and programmable read-only memory (EEPROM), or a hard disk drive (HDD) and a volatile storage device such as a random-access memory (RAM) or a register.

The power supply controller 72 controls the power supply unit 34 so that the power supply unit 34 supplies electric power to the portable wireless terminal 10 and enables the portable wireless terminal 10 to transmit the terminal ID to the host vehicle using the supplied electric power.

The communication controller 74 controls the out-of-cabin communication unit 50 or the in-cabin communication unit 60 so that the out-of-cabin communication unit 50 or the in-cabin communication unit 60 communicates with the portable wireless terminal 10. When the power supply unit 34 supplies electric power to the portable wireless terminal 10 according to electromagnetic induction, in a case where the use permitter 76 permits the start of the host vehicle, the communication controller 74 causes the in-cabin communication unit 60 to transmit an in-cabin request signal to the cabin and detects an in-cabin response signal, which is a response of the portable wireless terminal 10 to the transmitted in-cabin request signal.

The use permitter 76 decides to permit or disallow the use of the host vehicle by the user. Permitting the use of the host vehicle here is, for example, permitting the unlocking of the door lock of the host vehicle, permitting the start of the host vehicle, or the like. For example, the use permitter 76 compares the terminal ID received from the portable wireless terminal 10 using the out-of-cabin communication unit 50 with the terminal ID registered in the in-vehicle storage 90 in advance and permits the unlocking of the door lock of the host vehicle based on a comparison result. For example, the use permitter 76 permits the unlocking of the door lock of the vehicle when the received terminal ID is identical to the terminal ID registered in the in-vehicle storage 90 in advance. This terminal ID is included in the out-of-cabin response signal.

For example, the use permitter 76 compares the terminal ID received from the portable wireless terminal 10 using the in-cabin communication unit 60 with the terminal ID registered in the in-vehicle storage 90 in advance and permits the start of the vehicle based on a comparison result. The use permitter 76 permits the start of the vehicle when the received terminal ID is identical to the terminal ID registered in the in-vehicle storage 90 in advance. This terminal ID is included in the in-cabin response signal. The in-cabin response signal includes information indicating the remaining amount of electric power of the power supply 20. Permitting the start of the vehicle is permitting control so that the vehicle is in any state such as a state in which the engine is started, a state in which a motor is started, or a state in which a lock of a steering wheel is unlocked.

The user manager 78 manages a user account registered in the in-vehicle device 30 for the user of the host vehicle. Setting information for automatic adjustment of the seat position (hereinafter referred to as "seat position setting information") is associated with the user account. The user account does not necessarily have to correspond one-to-one with the user. For example, the user may create a plurality of user accounts with different setting content for the seat position setting information and separately use the user accounts in accordance with a use state, a purpose, and the like. For simplicity below, it is assumed that one user account is registered for each user in the in-vehicle device 30. User account management information (hereinafter referred to as "account management information"), for example, is stored in the in-vehicle storage 90.

The user manager 78 automatically adjusts the seat position in accordance with a user account (hereinafter referred to as a "target account") designated as a setting target. More specifically, the user manager 78 acquires the seat position setting information of the target user account with reference to the account management information and automatically adjusts the seat position based on the acquired seat position setting information. The target account may be designated when the user performs a manipulation of selecting the user account to be used as the target account from the user accounts registered in the in-vehicle device 30. When the terminal ID is transmitted from the portable wireless terminal 10, the target account may be mechanically decided on by associating it with the portable wireless terminal 10. Here, the user manager 78 is an example of an "registrant," an "identifier" and a "setter."

FIG. 2 is a diagram showing a specific example of account management information. The account management information 92 is managed, for example, as a table in which a corresponding terminal ID and seat position setting information are associated with a user ID. The user ID is user account identification information. The corresponding terminal ID indicates the association between the user account and the portable wireless terminal 10 and the identification information (terminal ID) of the portable wireless terminal 10 associated with the corresponding user account is stored. The example of FIG. 2 indicates a case where the portable wireless terminal 10A (here, terminal ID "1") is associated with "predetermined user #1" and the portable wireless terminal 10B (here, terminal ID "2") is associated with "predetermined user #2."

The seat position setting information is expressed, for example, by a set of identification information of a control target seat and information of a target seat position (for example, an amount of displacement from a reference position). In the example of FIG. 2, the seat position setting information of "predetermined user #1" indicates that a seat identified by "S1" is controlled so that the seat is at the seat position "aaa." In the example of FIG. 2, the seat position setting information of "predetermined user #2" indicates that a seat identified by "S1" is controlled so that the seat is at a seat position "bbb" and a seat identified by "S2" is controlled so that the seat is at a seat position "ccc." Thus, the seat position setting information may include setting information for a plurality of seats.

In the example of FIG. 2, the seat position setting information of "general user #1" indicates a case where a plurality of setting patterns (here, patterns 1 to 4) are registered. The above-described seat position setting information of "predetermined user #1" and "predetermined user #2" is all examples of cases where one setting pattern is registered. One of the plurality of setting patterns to be adopted may be decided on by a default value or may be decided on by the user's selection manipulation. A plurality of setting patterns may be changed by the user's switching manipulation or a previously used setting pattern may be automatically handed over.

In the example of FIG. 2, "predetermined user #1" and "predetermined user #2" are predetermined user accounts registered in advance in the in-vehicle device 30 of the initial state and are user accounts associated with the portable wireless terminal 10 of the user. Here, two predetermined user accounts are created in consideration of two portable wireless terminals 10A and 10B. For example, the predetermined user account is registered in the in-vehicle device 30 by a manufacturer of the host vehicle, a manufacturer of the in-vehicle device, a car dealer that sells the host vehicle or the in-vehicle device, or the like. The seat position setting information set in the predetermined user account may be uniformly decided on by a registrant (for example, a manufacturer or a car dealer) or may be decided on by the registrant to reflect the user's request.

[4. Process at Time of Boarding and Starting]

[4.1. Process at Time of Boarding; when Door Lock is Unlocked Through Communication]

When the user boards the host vehicle, the following process is performed. For example, when a predetermined condition is satisfied (for example, when the controller 70 acquires an instruction signal for unlocking the door lock), the communication controller 74 of the controller 70 causes the out-of-cabin communication unit 50 to transmit an out-of-cabin request signal.

When the out-of-cabin request signal is received, the portable wireless terminal transmits an out-of-cabin response signal, which is a response to the out-of-cabin request signal, to the out-of-cabin communication unit 50.

The user manager 78 of the controller 70 determines whether or not the user ID included in the out-of-cabin response signal received by the out-of-cabin communication unit 50 is identical to the user ID stored in the in-vehicle storage 90. When the user IDs are identical, the user manager 78 causes the door lock controller 38 to unlock the door lock of the host vehicle. Thereby, the user can board the host vehicle.

[4.2. Process at the Time of Starting; Process at Normal Time]

For example, as described above, when the door lock is unlocked through communication and an engine start manipulation is performed, the communication controller 74 causes the in-cabin communication unit 60 to transmit an in-cabin request signal. The engine start manipulation is, for example, a manipulation in which the engine switch 32 is pressed in a state in which a brake pedal is depressed. When the portable wireless terminal 10 receives an in-cabin request signal, the portable wireless terminal 10 transmits an in-cabin response signal, which is a response to the in-cabin request signal, to the in-cabin communication unit 60.

The user manager 78 of the controller 70 determines whether or not a user ID included in the in-cabin response signal received by the in-cabin communication unit 60 is identical to the user ID stored in the in-vehicle storage 90. When the user IDs are identical, the user manager 78 causes the engine ECU 82 to operate the engine. Thereby, the user can start the engine of the host vehicle.

[5. Automatic Adjustment Function for Seat Position]

Figure 3:
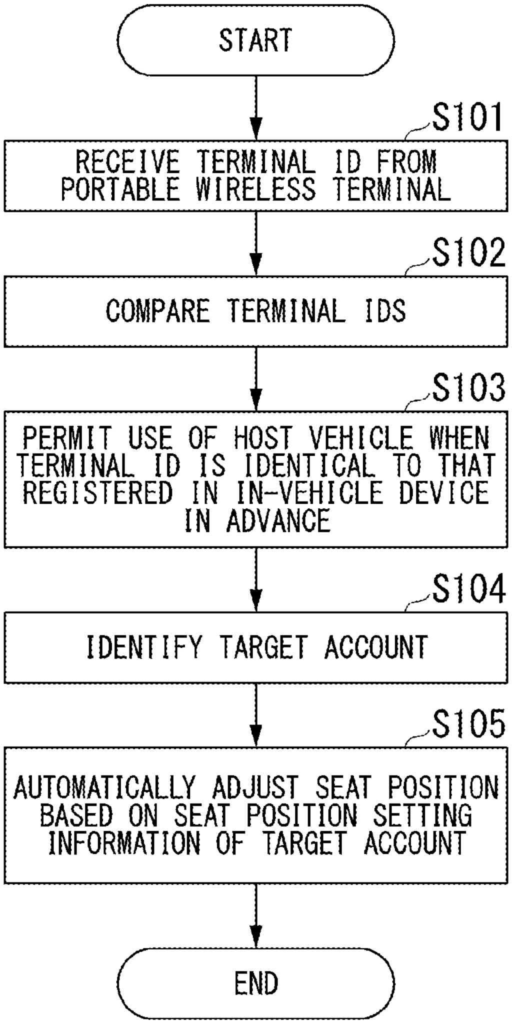
FIG. 3 is a flowchart showing a flow of a process executed by a controller 70.

FIG. 3 is a flowchart showing an example of a flow of a process in which the in-vehicle device 30 automatically adjusts the seat position when the user uses the host vehicle. First, the in-vehicle device 30 receives a terminal ID from the portable wireless terminal 10 (S101). Subsequently, the in-vehicle device 30 compares the received terminal ID with a terminal ID registered in the in-vehicle storage 90 in advance (S102) and permits the use of the host vehicle (the unlocking of the door lock or the transmission of the host vehicle) when the two are identical (S103). Subsequently, the in-vehicle device 30 identifies a target account with reference to the account management information 92 based on the received terminal ID (S104). Subsequently, the in-vehicle device 30 automatically adjusts a seat position based on seat position setting information of the identified target account (S105).

[6. Operation when New User Account is Added]

Figure 4:
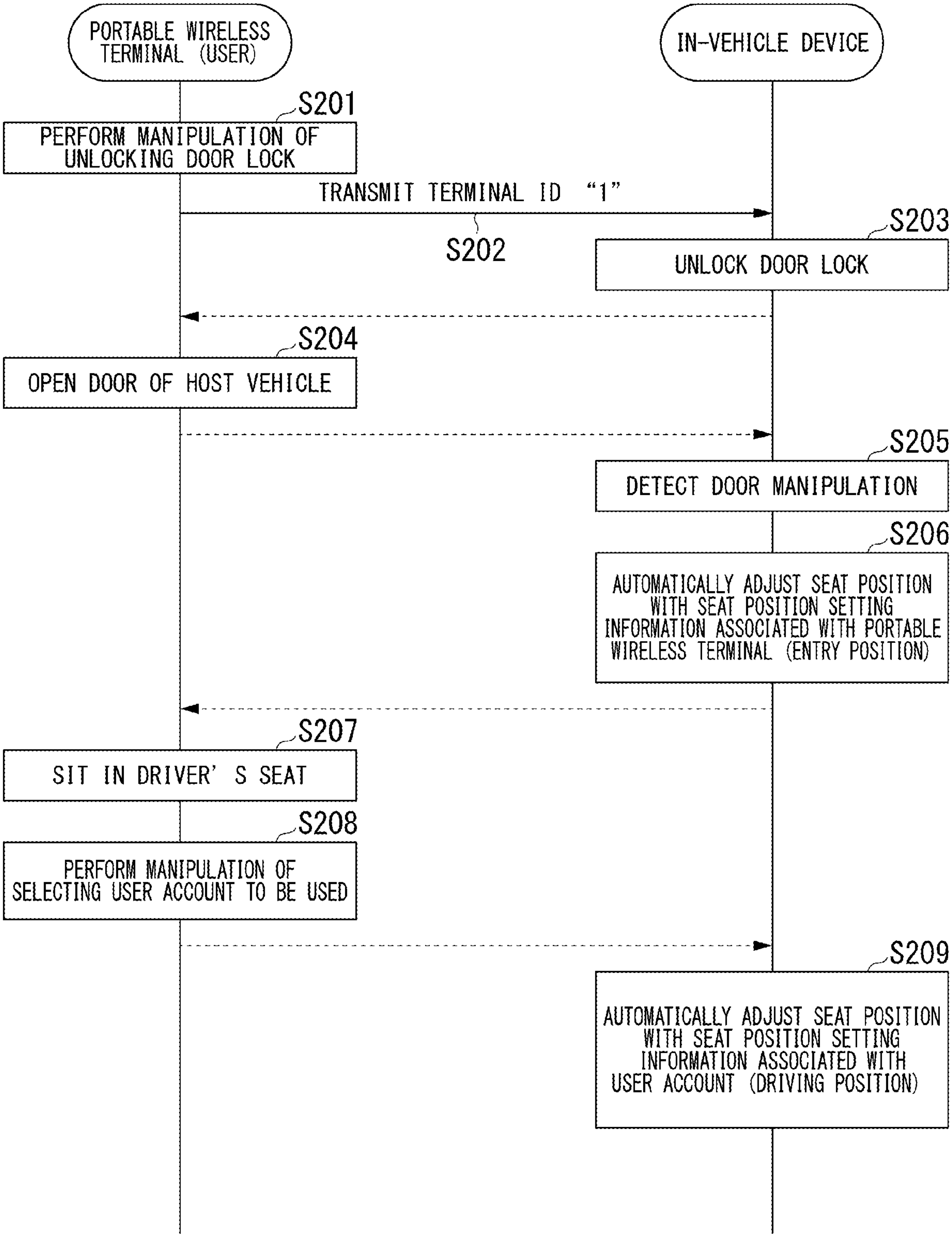
FIG. 4 is a sequence chart (Part 1) showing an example of a flow of a user addition process.
Figure 5:
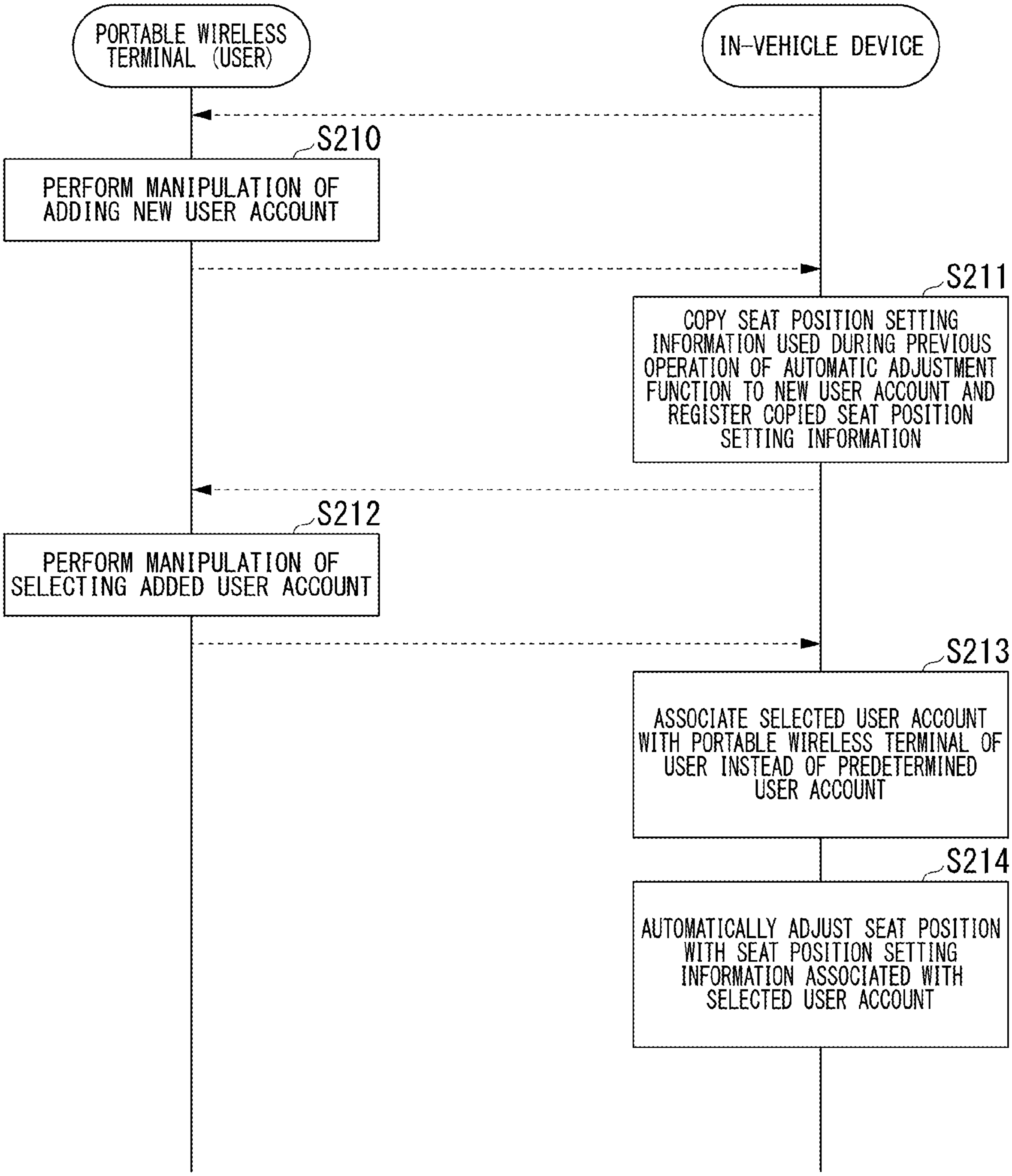
FIG. 5 is a sequence chart (Part 2) showing an example of a flow of a user addition process.

Hereinafter, a flow of a process (hereinafter referred to as a "user addition process") executed by the in-vehicle device 30 when a new user account is registered will be described with reference to FIGS. 4 to 6. FIGS. 4 and 5 are sequence charts showing an example of the flow of the user addition process. At the start of the sequence chart, it is assumed that the host vehicle is equipped with the in-vehicle device 30 in an initial state. As described in FIG. 2, only a predetermined user account is registered in the in-vehicle device 30 of the initial state and predetermined seat position setting information is registered in the predetermined user account in advance.

Figure 6:
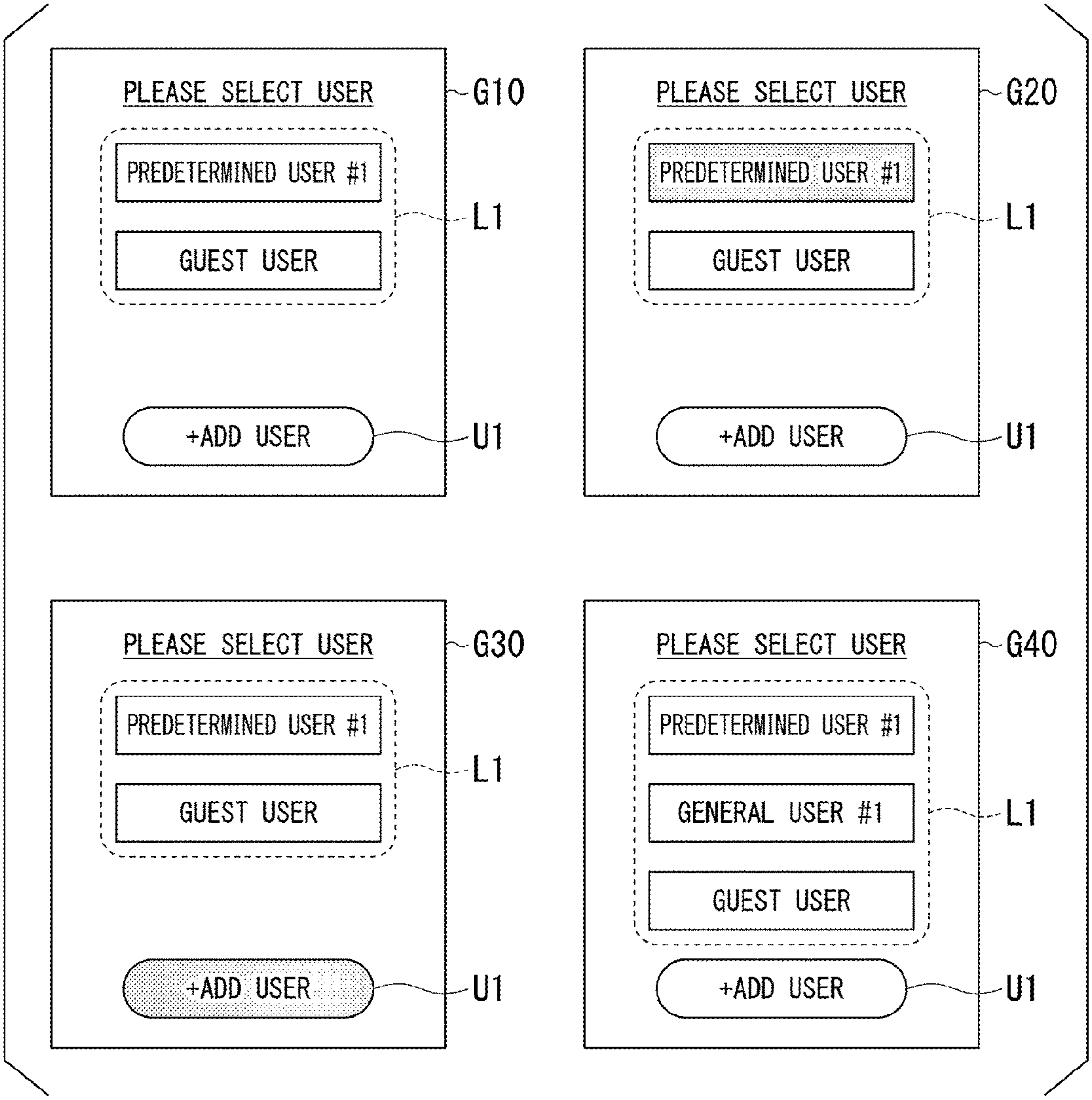
FIG. 6 is a diagram schematically showing a state in which a user management screen transitions in accordance with the progress of the sequence chart.

FIG. 6 is a diagram schematically showing a state in which a user management screen displayed on the in-vehicle device 30 transitions in accordance with the progress of the chart. The user management screen is a screen provided to a user as a user interface for allowing the user to select a user account registered in the in-vehicle device 30 or perform a user account management manipulation. Here, as an example, a user management screen configured to display a list of registered user accounts and receive a new user account registration manipulation is exemplified.

First, the user unlocks the door lock of the host vehicle using the portable wireless terminal 10 (terminal ID "1") (S201). According to this manipulation, a terminal ID is transmitted from the portable wireless terminal 10 to the in-vehicle device 30 (S202) and the in-vehicle device 30 unlocks the door lock based on the received terminal ID (S203, see FIG. 3). For example, in accordance with the operation of unlocking the door lock, a user management screen G10 is displayed on the in-vehicle device 30 (FIG. 6). The user management screen G10, for example, displays a list of user accounts L1 (here, "predetermined user #1" and "guest user") available to the user among the registered user accounts and a user interface UI for receiving a manipulation of adding a new user account or waits for a manipulation of selecting one of the user accounts to be input. The example of the user management screen G10 is an example in which "predetermined user #1" associated with the portable wireless terminal 10 among predetermined user accounts and "guest user" corresponding to a user account open to an unspecified user are displayed so that they can be selected as available user accounts. All predetermined user accounts not associated with the portable wireless terminal 10 may be displayed on the user management screen G10.

Subsequently, the user opens the door of the host vehicle after the door lock is unlocked in S203 (S204). A dashed arrow in the drawing indicates an anteroposterior relationship between a step immediately before the arrow and a step immediately after the arrow. When this door manipulation is detected by the door sensor 40 (S205), the in-vehicle device 30 automatically adjusts the seat position with reference to the seat position setting information of the user account (here, "predetermined user #1") associated with the portable wireless terminal 10 used to unlock the door lock (S206). The seat position after adjustment at this time is, for example, a position (entry position) proximate to a rear seat side where the user can easily board his or her vehicle. Here, for example, it is assumed that the seat position of the driver's seat is adjusted.

Subsequently, after the seat position is automatically adjusted to the entry position in S206, the user boards the host vehicle and sits in the driver's seat (S207) and performs a manipulation of selecting a user account to be used for the in-vehicle device 30 (S208). Here, it is assumed that "predetermined user #1" associated with the portable wireless terminal 10 is selected. A user management screen G20 indicates a state in which "predetermined user #1" is selected in the in-vehicle device 30. In accordance with this manipulation, the in-vehicle device 30 automatically adjusts the seat position with reference to the seat position setting information associated with the selected predetermined user account "predetermined user #1" (S209). The seat position after adjustment at this time is, for example, a position (driving position) where the user can easily perform a driving manipulation.

Subsequently, the user performs a manipulation of adding a new user account to the in-vehicle device 30 (S210). A user management screen G30 indicates a state in which a user interface UI for adding a new user account to the in-vehicle device 30 is manipulated. In accordance with this manipulation, for example, a new user account registration screen is displayed on the in-vehicle device 30 and the user creates a new user account by manipulating a registration screen. Here, the user manager 78 copies and registers the seat position setting information (here, the driving position of "predetermined user #1") used during an operation of the previous automatic adjustment function as the seat position setting information of the new user account (S211). A user management screen G40 indicates a state in which a list of user accounts is displayed after the user account "general user #1" is newly registered.

Subsequently, to make a change from the current predetermined user account "predetermined user #1" to the newly registered user account "general user #1," the user performs a manipulation of selecting "general user #1" from the user accounts listed and displayed on the in-vehicle device 30 (S212). In accordance with this manipulation, the in-vehicle device 30 changes the association of the user account with the portable wireless terminal 10 from "predetermined user #1" to "general user #1" (S213) and automatically adjusts the seat position with reference to the seat position setting information associated with the selected user account "general user #1" (S214).

Because the seat position setting information of general user #1 is registered by copying the seat position setting information of "predetermined user #1" in S211, the automatic adjustment function of the seat position is operated, but the actual seat position is not changed in S214. In this case, the association between the portable wireless terminal 10 and the user account is updated in S213, such that it is possible to seamlessly implement a flow of the unlocking of the door lock ~ the automatic adjustment of the seat position ~ the start without performing a manipulation of changing the user account when the user uses the host vehicle the next time with the portable wireless terminal 10. Here, the user account of a copy source is an example of "first user information" and the user account of a copy destination is an example of "second user information."

According to the vehicle control system 1 of the embodiment configured as described above, the convenience of the automatic adjustment function of the driving environment can be improved. More specifically, because a predetermined value or the like is used as a default value of seat position setting information different from that of a current seat position in a conventional process of adding a new user account, the automatic adjustment function may operate at a timing unintended by the user when a new user account is added. On the other hand, in the vehicle control system 1 of the embodiment, the seat position setting information used in the previous automatic adjustment of the seat position is copied and set as a default setting value when a new user account is added and therefore it is possible to improve convenience by suppressing an unintended operation of the automatic adjustment function when a new user account is added.

Modified Example

Although the case where the user manager 78 adjusts the seat position as an example of the driving environment has been described in the above-described embodiment, the driving environment of an adjustment target is not limited thereto. For example, the user manager 78 may be configured to control an angle of a fender mirror, an inclination of the seat, a position and angle of the steering wheel, and the like. Even in such a case, the implementation is possible in a method similar to the automatic adjustment of the seat position by managing control setting information in association with a user account.

In the above-described embodiment, the in-vehicle device 30 may be configured to set a plurality of driving environments by associating setting information of the plurality of driving environments with user accounts. For example, a configuration in which the above-described seat position, the angle of the fender mirror, the tilt of the seat, the position and angle of the steering wheel, and the like are automatically adjusted at the same timing or at different timings may be adopted. In this case, the user manager 78 may be configured not to copy setting information for equipment that is different from the seat and has a small influence on the user due to a setting change. For example, examples of setting information that is not copied include a driving mode, an audio setting, an air conditioner setting, and the like. This is because the equipment operating with these settings does not or is unlikely to come into direct contact with the user's body, and therefore there is no problem even if the setting value is changed when a new user account is added.

Although modes for carrying out the present invention have been described above using embodiments, the present invention is not limited to the embodiments and various modifications and substitutions can also be made without departing from the scope and spirit of the present invention.

What is claimed is:

1. A mobile object setting device for setting equipment provided in a mobile object, the mobile object setting device comprising:

a storage device configured to store a program and setting information of an automatic adjustment function which is a function for automatically adjusting a state of the equipment; and a hardware processor, wherein the hardware processor manages the setting information in association with a user of the mobile object by executing the program stored in the storage device, registers user information about the user and the setting information of the equipment in the storage device, identifies the user of the mobile object, and acquires the setting information of the equipment associated with the identified user from the storage device to set the equipment based on the acquired setting information, wherein the hardware processor acquires first setting information, which is the setting information of the equipment associated with first user information registered in advance and used in the previous operation of the automatic adjustment function, from the storage device and registers the acquired first setting information in association with second user information different from the first user information, wherein the mobile object has a plurality of pieces of the equipment, wherein the setting information of the equipment is seat position setting information for setting a position of a seat provided in the mobile object, and wherein a copy of the seat position setting information associated with the first user information is associated with seat position setting information of the second user information, and setting information other than the seat position setting information is not copied.

2. A mobile object setting device for setting equipment provided in a mobile object, the mobile object setting device comprising:

a storage device configured to store a program and setting information of the equipment; and a hardware processor, wherein the hardware processor manages the setting information in association with a user of the mobile object by executing the program stored in the storage device, registers user information about the user and the setting information of the equipment in the storage device, identifies the user of the mobile object, and acquires the setting information of the equipment associated with the identified user from the storage device to set the equipment based on the acquired setting information, wherein the hardware processor acquires first setting information, which is the setting information of the equipment associated with first user information registered in advance, from the storage device, and registers setting information having the same content as the first user information in association with the second user information when the second user information is newly registered, wherein the mobile object has a plurality of pieces of the equipment, wherein the setting information of the equipment is seat position setting information for setting a position of a seat provided in the mobile object, and wherein a copy of the seat position setting information associated with the first user information is associated with seat position setting information of the second user information, and setting information other than the seat position setting information is not copied.

3. A mobile object setting method comprising:

managing, by a setting device for setting equipment provided in a mobile object, setting information of an automatic adjustment function which is a function for automatically adjusting a state of the equipment in association with a user of the mobile object in a storage device configured to store the setting information;

registering, by the setting device, user information about the user and the setting information of the equipment in the storage device;

identifying, by the setting device, the user of the mobile object; and acquiring, by the setting device, the setting information of the equipment associated with the identified user from the storage device to set the equipment based on the acquired setting information;

wherein acquiring, by the setting device, first setting information, which is the setting information of the equipment associated with first user information registered in advance and used in the previous operation of the automatic adjustment function, from the storage device in the registration of the setting information and registering the acquired first setting information in association with second user information different from the first user information, wherein the mobile object has a plurality of pieces of the equipment, wherein the setting information of the equipment is seat position setting information for setting a position of a seat provided in the mobile object, and wherein a copy of the seat position setting information associated with the first user information is associated with seat position setting information of the second user information, and setting information other than the seat position setting information is not copied.

4. A non-transitory storage medium storing a program for causing a setting device for setting equipment provided in a mobile object to:

manage setting information of an automatic adjustment function which is a function for automatically adjusting a state of the equipment in association with a user of the mobile object in a storage device configured to store the setting information;

register user information about the user and the setting information of the equipment in the storage device;

identify the user of the mobile object; and acquire the setting information of the equipment associated with the identified user from the storage device to set the equipment based on the acquired setting information;

wherein the setting device is caused to acquire first setting information, which is the setting information of the equipment associated with first user information registered in advance and used un the previous operation of the automatic adjustment function, from the storage device in the registration of the setting information and register the acquired first setting information in association with second user information different from the first user information, wherein the mobile object has a plurality of pieces of the equipment, wherein the setting information of the equipment is seat position setting information for setting a position of a seat provided in the mobile object, and wherein a copy of the seat position setting information associated with the first user information is associated with seat position setting information of the second user information, and setting information other than the seat position setting information is not copied.

5. A mobile object setting method comprising:

managing, by a setting device for setting equipment provided in a mobile object, setting information of the equipment in association with a user of the mobile object in a storage device configured to store the setting information, registering, by the setting device, user information about the user and the setting information of the equipment in the storage device, identifying, by the setting device, the user of the mobile object, and acquiring, by the setting device, the setting information of the equipment associated with the identified user from the storage device to set the equipment based on the acquired setting information, wherein acquiring, by the setting device, first setting information, which is the setting information of the equipment associated with first user information registered in advance, from the storage device, and registering setting information having the same content as the first user information in association with the second user information when the second user information is newly registered, wherein the mobile object has a plurality of pieces of the equipment, wherein the setting information of the equipment is seat position setting information for setting a position of a seat provided in the mobile object, and wherein a copy of the seat position setting information associated with the first user information is associated with seat position setting information of the second user information, and setting information other than the seat position setting information is not copied.

6. A non-transitory storage medium storing a program for causing a setting device for setting equipment provided in a mobile object to:

manage the setting information of the equipment in association with a user of the mobile object in a storage device configured to store the setting information, register user information about the user and the setting information of the equipment in the storage device, identify the user of the mobile object, and acquire the setting information of the equipment associated with the identified user from the storage device to set the equipment based on the acquired setting information, wherein the setting device is caused to acquire first setting information, which is the setting information of the equipment associated with first user information registered in advance, from the storage device, and register setting information having the same content as the first user information in association with the second user information when the second user information is newly registered, wherein the mobile object has a plurality of pieces of the equipment, wherein the setting information of the equipment is seat position setting information for setting a position of a seat provided in the mobile object, and wherein a copy of the seat position setting information associated with the first user information is associated with seat position setting information of the second user information, and setting information other than the seat position setting information is not copied.

* * * * *